United States Patent
Welch et al.

(10) Patent No.: US 6,921,210 B2
(45) Date of Patent: Jul. 26, 2005

(54) FLANGE BEARING

(75) Inventors: Sean Michael Welch, Clawson, MI (US); Ronald J. Thompson, Howell, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 291 days.

(21) Appl. No.: 10/412,799

(22) Filed: Apr. 11, 2003

(65) Prior Publication Data

US 2004/0202391 A1 Oct. 14, 2004

(51) Int. Cl.$^7$ .................................................. F16C 9/02
(52) U.S. Cl. ...................... 384/294; 384/123; 384/288
(58) Field of Search ................................ 384/107, 121, 384/123, 275, 288, 296, 429

(56) References Cited

U.S. PATENT DOCUMENTS

| | | | |
|---|---|---|---|
| 4,049,327 A | | 9/1977 | Goloff et al. |
| 4,714,356 A | | 12/1987 | Damour et al. |
| 4,726,695 A | | 2/1988 | Showalter |
| 4,995,735 A | | 2/1991 | Dansdill |
| 5,114,246 A | * | 5/1992 | Gowan ........................ 384/275 |
| 5,192,136 A | | 3/1993 | Thompson et al. |
| 5,363,557 A | | 11/1994 | Thompson et al. |
| 5,503,478 A | | 4/1996 | Blaine |
| 5,520,466 A | * | 5/1996 | Everitt et al. ................ 384/294 |
| 5,707,155 A | | 1/1998 | Banfield et al. |
| 6,176,621 B1 | | 1/2001 | Naitoh et al. |
| 6,481,895 B2 | * | 11/2002 | Yang et al. .................. 384/294 |
| 2002/0094143 A1 | * | 7/2002 | Yang et al. .................. 384/294 |

* cited by examiner

*Primary Examiner*—William C. Joyce
(74) *Attorney, Agent, or Firm*—Howard & Howard

(57) ABSTRACT

An engine bearing for an internal combustion engine has a pair of separately constructed bearing halves comprising a pair of arcuate shells having a pair of laterally spaced flanges extending generally radially outwardly from each shell. Each pair of laterally spaced flanges comprises a pair of thrust faces facing generally away from one another with one of the thrust faces comprising an undulating contoured surface and the other thrust face having a generally planar non-contoured surface. The engine bearing is assembled having the contoured surface of one engine bearing half abutting the non-contoured surface of the other engine bearing half so that the engine bearing has generally opposite sides comprising both contoured and non-contoured surfaces.

5 Claims, 2 Drawing Sheets

FLANGE BEARING

BACKGROUND OF THE INVENTION

1. Field of the Invention

The invention relates generally to engine bearings for internal combustion engines, and more particularly to engine bearings having radially outwardly extending flanges for accommodating thrust loads.

2. Related Art

It is common to support internal combustion engine crankshafts with journal bearings located at axially spaced locations along the crankshaft. Each journal bearing typically includes a pair of mating halves including an upper half bearing seated in an arcuate recess in a lower part of an engine block, and a lower half bearing seated in an arcuate recess of a cap. The cap is typically bolted to the engine block to retain the two bearing halves encircled about the crankshaft.

Of the journal bearings spaced along the crankshaft, typically, at least one journal bearing is designed to take an axial thrust load applied by the crankshaft. A crankshaft journal bearing capable of withstanding thrust loads in generally opposite axial directions is particularly beneficial in pull-type diaphragm-spring clutch applications. Pull-type diaphragm-spring clutches typically generate a forward acting thrust force while the clutch is engaged, and a rearward acting thrust force while the clutch is disengaged. This results from having the release bearing being pulled rearwardly in a pull-clutch, rather than being pushed forwardly as in a normal clutch application. Rearward thrust loads act on the crankshaft in normal diaphragm-spring clutches, but they typically are not as high as the rearward thrust loads acting on the thrust bearings in pull-type diaphragm-spring clutches. As such, it is even more beneficial that a crankshaft journal bearing be able to withstand bi-directional thrust loads in a pull-type clutch application.

U.S. Pat. No. 5,192,136 discloses a journal bearing constructed with a pair of generally opposite flanges on each bearing half having oil grooves and contoured surfaces designed to seat against side surfaces of the crankshaft arms to take on bi-directional thrust loads. The contoured surfaces on each flange subdivide the thrust bearing surface into a plurality of thrust pads. Each thrust pad is contoured to generate a protective hydrodynamic wedge film thrust support action in order to separate the two opposing surfaces and to prevent metal-to-metal contact between the thrust face and the crank shaft under axial loading.

In manufacture, constructing each of the flanges of the journal bearing with oil grooves and contoured surfaces comes at a cost. The number of manufacturing processes is increased, the amount of manufacturing time is increased, the amount of required tooling is increased, potential scrap is increased, and the amount of labor is increased, among other associated costs throughout the manufacturing process.

It is an object of the present invention to provide a suitable thrust bearing out of simpler construction and lower cost to overcome the shortcomings of prior hydrodynamic thrust bearings.

SUMMARY OF THE INVENTION

A thrust bearing constructed according to the invention has a pair of separately constructed bearing halves with an arcuate shell portions abutting one another about a longitudinal axis of the bearing. Each bearing half has a pair of longitudinally spaced flanges extending radially outwardly from the shell and presenting longitudinally outwardly facing thrust faces. One of the thrust faces of each bearing half is contoured having hydrodynamic recessed features dividing the contoured thrust face into a plurality of thrust pads and shaped to induce a hydrodynamic flow of oil across the thrust face during operation of the bearing. The other thrust face of each bearing half is substantially free of such hydrodynamic recessed features. According to the invention, the contoured thrust face of one of the bearing halves is arranged on a longitudinally opposite side than that of the contoured thrust face of the other bearing half.

One advantage of the invention is that an inexpensive thrust bearing is provided having a bi-directional loading capabilities with only one contoured thrust face on each bearing half arranged longitudinally opposite one another.

Another advantage of the invention is providing a split engine bearing requiring fewer manufacturing steps, namely eliminating the formation of a contoured surface on a thrust face of each bearing.

Another advantage of the invention is that the bearing halves may be identical in construction but oriented with their contoured thrust surfaces opposite one another to achieve bi-directional loading.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
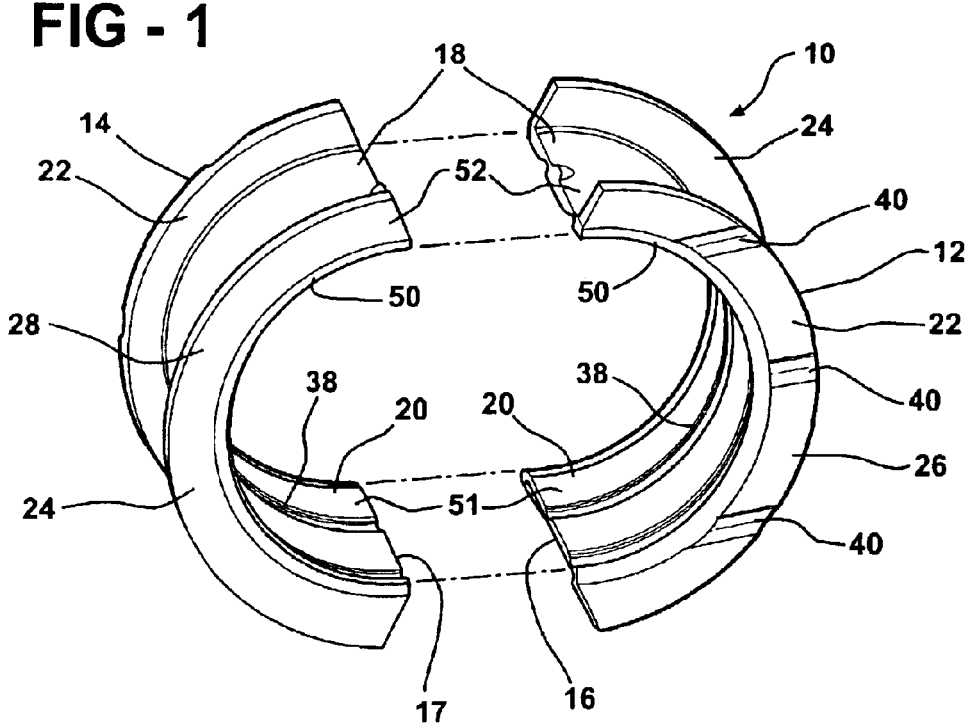
FIG. 1 is an exploded perspective view of a presently preferred embodiment of the invention.
Figure 2:
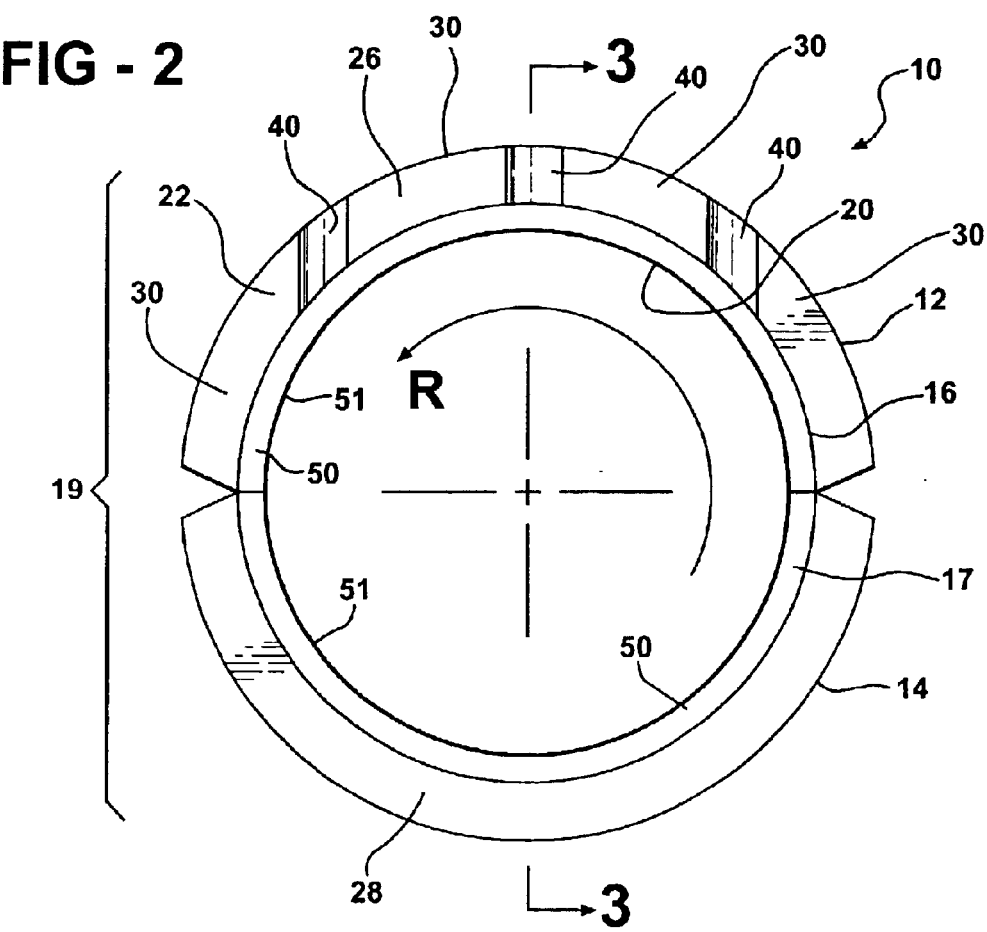
FIG. 2 is a side elevation view of the assembled thrust bearing of FIG. 1.
Figure 3:
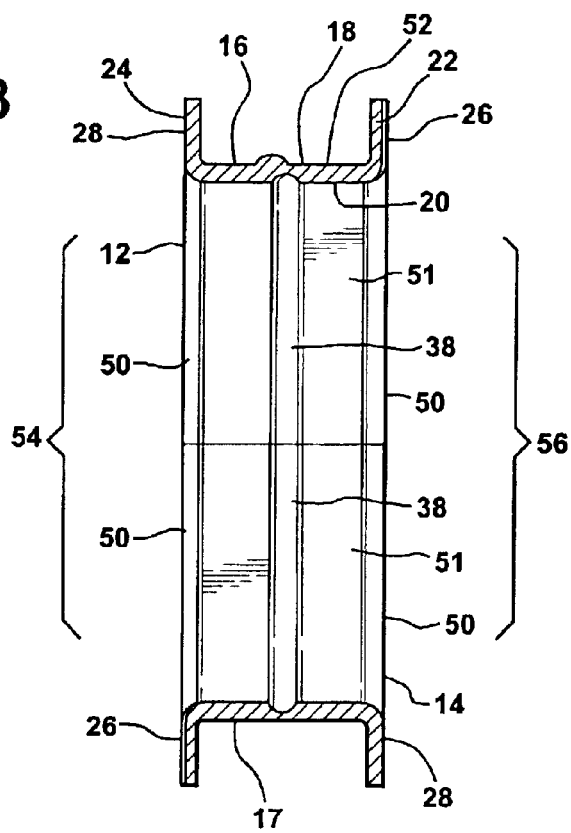
FIG. 3 is a cross-sectional view taken generally along lines 3—3 of FIG. 2.

A presently preferred embodiment of an engine thrust bearing constructed according to the present invention is shown generally at 10 in FIGS. 1–3. The engine bearing 10 is comprised of a pair of separately constructed engine bearing halves 12, 14, wherein each half 12, 14 is preferably identical to the other in construction. The engine bearing halves 12, 14 have generally arcuate shells 16, 17 disposed in abutting end-to-end engagement about a longitudinal axis 21 of the bearing 10, such that when the halves 12, 14 are assembled, the shells 16, 17 form a generally cylindrical shell 19 defining an outer surface 18 and a bore or inner surface 20 of the engine bearing. Each half 12, 14 has a pair of longitudinally spaced thrust flanges 22, 24 extending radially outwardly from each shell 16, 17.

Figure 4:
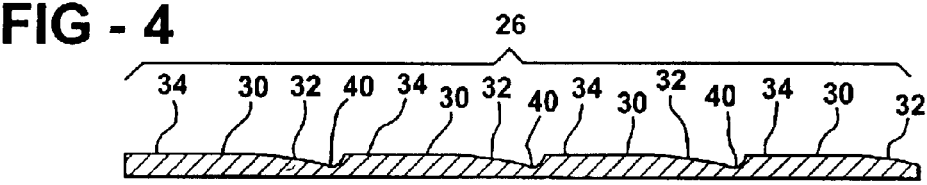
FIG. 4 is an enlarged and magnified partial view of the contoured thrust face.

The flange 22 of bearing half 12 has a contoured thrust face 26, while the opposite flange 24 of bearing half 12 has a generally non-contoured thrust face 28. The other bearing half 14 has the same contoured 26 and non-contoured 28 thrust faces, but which are arranged longitudinally opposite that of the thrust faces of the bearing half 12. As best shown in FIG. 4, the contoured faces 26 have a profile comprising circumferentially spaced ramps 30 having low portions 32 and high portions 34. The ramps 30 are preferably arranged adjacent one another so that the low portion 32 of one ramp 30 is adjacent the high portion 34 of the adjacent ramp 30. Having the ramps 30 arranged in this manner facilitates oil flow in the direction of shaft rotation, as represented in a counterclockwise direction by arrow R in FIG. 3.

By maintaining an oil flow across the contoured ramps 30 in the direction of shaft rotation, a hydrodynamic oil film between the faces 26, 28 and a mating surface, such as a shoulder on a crankshaft (not shown), is established and maintained. The oil film acts to inhibit metal-to-metal contact between the flanges 22, 24 and the adjacent rotating surface of the crankshaft. To further facilitate the flow of fluid, and thus the build-up of a hydrodynamic fluid film between a shoulder of a rotating crankshaft (not shown) and the thrust faces 26, 28, cutouts 48 within the flanges 26, 28 may be formed at their ends to feed oil between the faces 26, 28 and the crankshaft.

As best shown in FIG. 3, pressurized lubricating oil is supplied to the bearing assembly through a hole or port in the cylinder block wall (not shown) and into a groove 38 formed in the inner surface 20 of each shell 16, 17. As the crankshaft rotates in the direction of the arrow R, the oil is carried by the rotating shaft surface onto the inner surface 20 of the shell 17 of the lower bearing half 14. In this fashion, a ring of oil encircles the shaft surface to provide hydrodynamic radial support for the shaft. The inner surface 20 of the cylindrical shell 19 serves as a radial bearing surface for the shaft.

As best shown in FIGS. 1, 2 and 4, to further facilitate oil flow across the contoured face 26, preferably a plurality of oil grooves 40 are formed generally parallel to one another between each low portion 32 and high portion 34 of the ramps 30. The oil grooves 40 facilitate the introduction of oil between the contoured face 26 and a mating surface of the crankshaft. Once the oil is in the oil grooves 40, the oil is preferably channeled circumferentially about the ramps 30 in the direction of shaft rotation (R). It should be recognized that the oil grooves 40 may be other than parallel.

Figure 5:
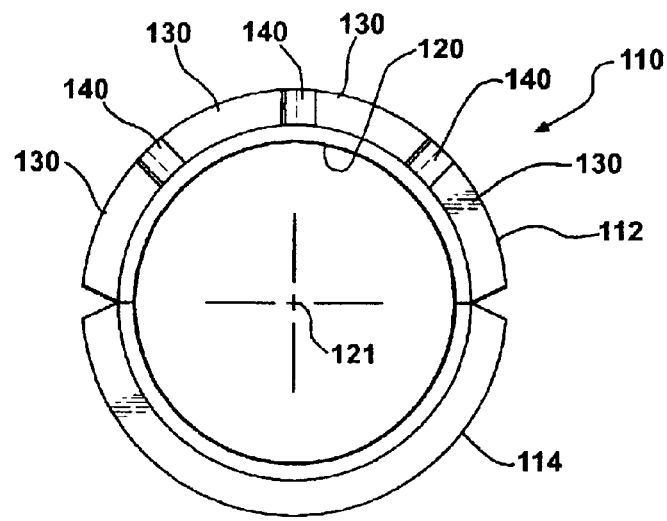
FIG. 5 is an alternate embodiment of the present invention.

In FIG. 5, like components and features of the embodiment of FIGS. 1–4 are shown by the same reference numbers, but are offset by 100. An engine bearing 110 having an axis of rotation 121 has flanges 122 with contoured faces 126 comprising a plurality of adjacent ramps 130. The ramps 130 have oil grooves 140 therebetween, with the oil grooves 140 extending generally radially outwardly from the axis 120.

A recessed corner 50 is preferably formed where the flanges 22, 24 meet the inner surface 20. The recessed corner 50 may be chamfered, flat, or rounded and is preferably sized to provide clearance with the mating surface of the crankshaft. The clearance provides oil flow between the oil grooves 40, the contoured face 26, and the oil groove 38 in the inner surface 20.

In use, the two bearing halves 12, 14 are brought together to form the cylindrical shell 19 (FIG. 2) so that the contoured face 26 of each half 12, 14 is aligned with the non-contoured face 28 of the opposite half 14. The journal bearing 10 thus has opposite sides 54, 56 each with a contoured face 26 and a non-contoured 10 thus has opposite sides 54, 56 each with a contoured face 26 and a non-contoured face 28. Having only one flange 22 on each half 12, 14 with a contoured face 26 results in a reduced number of manufacturing operations associated with the manufacture of each half 12, 14. As such, the associated manufacturing costs is reduced for the journal bearing 10, 110.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A thrust bearing for use in journaling a rotating shaft in a lubricated environment subject to thrust loading, said thrust bearing, comprising:

first and second bearing halves having arcuate shell portions abutting one another about a longitudinal axis of said bearing, and a pair of longitudinally spaced thrust flanges disposed on each of said bearing halves and extending radially outwardly of said shell portions and presenting longitudinally outwardly facing thrust faces, one of said thrust faces of each of said bearing halves comprising a contoured thrust face having hydrodynamic recessed features driving said contoured thrust face into a plurality of spaced thrust pads and shaped to induce a hydrodynamic flow of lubricating oil across said contoured thrust face during operation of said bearing, and the other of said thrust faces of each of said bearing halves being substantially free of such hydrodynamic recessed features; and wherein said contoured thrust face of said first bearing half is arranged on a longitudinally opposite side of said first bearing half than that of said contoured thrust face of said second bearing half such that said contoured thrust faces face in longitudinally opposite directions.

2. The engine bearing of claim 1 wherein said contoured surface comprises a plurality of ramps having low portions and high portions adjacent one another.

3. The engine bearing of claim 2 wherein oil grooves are formed between said low portions and said high portions of said ramps.

4. The engine bearing of claim 3 wherein said oil grooves are generally parallel to one another.

5. The engine bearing of claim 3 wherein said oil grooves extend generally radially outwardly from said axis of said bearing.

* * * * *